(12) United States Patent
Kowada

(10) Patent No.: US 8,813,481 B2
(45) Date of Patent: Aug. 26, 2014

(54) EXHAUST EMISSION CONTROL DEVICE

(75) Inventor: Minoru Kowada, Tokyo (JP)

(73) Assignees: Hino Motors, Ltd., Hino-shi (JP); Isuzu Motors Limited, Tokyo (JP)

( * ) Notice: Subject to any disclaimer, the term of this patent is extended or adjusted under 35 U.S.C. 154(b) by 170 days.

(21) Appl. No.: 13/515,379

(22) PCT Filed: Dec. 21, 2010

(86) PCT No.: PCT/JP2010/007399
§ 371 (c)(1),
(2), (4) Date: Jun. 12, 2012

(87) PCT Pub. No.: WO2011/077703
PCT Pub. Date: Jun. 30, 2011

(65) Prior Publication Data
US 2012/0255287 A1 Oct. 11, 2012

(30) Foreign Application Priority Data
Dec. 24, 2009 (JP) .................................. 2009-291798

(51) Int. Cl.
| | | |
|---|---|---|
| *F01N 3/035* | (2006.01) | |
| *F01N 3/28* | (2006.01) | |
| *F01N 13/14* | (2010.01) | |
| *F01N 13/02* | (2010.01) | |
| *B01D 53/94* | (2006.01) | |
| *F01N 3/20* | (2006.01) | |

(52) U.S. Cl.
CPC ....... *F01N 3/2066* (2013.01); *F01N 2610/1453* (2013.01); *B01D 2251/2067* (2013.01); *F01N 3/28* (2013.01); *F01N 13/141* (2013.01); *F01N 13/02* (2013.01); *B01D 53/9477* (2013.01); *F01N 2610/02* (2013.01); *F01N 2240/20* (2013.01); *Y02T 10/24* (2013.01); *F01N 2490/00* (2013.01); *B01D 53/9431* (2013.01)

USPC .................. 60/295; 60/296; 60/297; 60/301; 60/311

(58) Field of Classification Search
USPC ........... 60/286, 295, 296, 297, 301, 311, 317, 60/324
See application file for complete search history.

(56) References Cited

U.S. PATENT DOCUMENTS

| | | | | |
|---|---|---|---|---|
| 2009/0313979 | A1 * | 12/2009 | Kowada ........................ | 60/297 |
| 2010/0186381 | A1 * | 7/2010 | Charles et al. ................. | 60/282 |
| 2010/0257850 | A1 * | 10/2010 | Kowada et al. ................ | 60/297 |

FOREIGN PATENT DOCUMENTS

| | | |
|---|---|---|
| JP | 2005 127271 | 5/2005 |
| JP | 2008 51011 | 3/2008 |
| JP | 2008 215286 | 9/2008 |
| JP | 2009 127463 | 6/2009 |
| JP | 2009127463 A * | 6/2009 |
| WO | WO 2008102560 A1 * | 8/2008 |

OTHER PUBLICATIONS
International Search Report Issued May 17, 2011 in PCT/JP10/07399 Filed Dec. 21, 2010.

* cited by examiner

*Primary Examiner* — Thomas Denion
*Assistant Examiner* — Jorge Leon, Jr.
(74) *Attorney, Agent, or Firm* — Oblon, Spivak, McClelland, Maier & Neustadt, L.L.P.

(57) ABSTRACT

An exhaust emission control device comprises a selective reduction catalyst for reacting $NO_x$ in an exhaust gas with ammonia, means for adding a urea water into the exhaust gas upstream of the catalyst and a cylindrical mixing pipe as a connection between the adding means and the catalyst, an entry end of the mixing pipe being formed with circumferential opening sections and provided with guide fins for guiding the exhaust gas to the opening sections tangentially of the entry end to provide a mixer structure, the adding means being arranged centrally on the entry end of the mixing pipe and directed toward an exit end of the mixing pipe for addition of the urea water into a swirling flow of the exhaust gas caused by the mixer structure. The opening sections are formed along the swirling flow.

3 Claims, 4 Drawing Sheets

Related Art

Related Art

EXHAUST EMISSION CONTROL DEVICE

TECHNICAL FIELD

The present invention relates to an exhaust emission control device.

BACKGROUND ART

It has been recently considered to incorporate a particulate filter in an exhaust pipe for collection of particulates in an exhaust gas, a selective reduction catalyst capable of selectively reacting NO with ammonia even in the presence of oxygen being arranged downstream of the particulate filter, a urea water as a reducing agent being added between the selective reduction catalyst and the particulate filter, thereby achieving simultaneous reduction of the particulates and $NO_x$.

In such a case, the addition of the urea water to the selective reduction catalyst takes place between the particulate filter and the selective reduction catalyst; thus, in order to secure a sufficient reaction time for thermal decomposition of the added urea water into ammonia and carbon dioxide gas, it is necessary to lengthen a distance from an added position of the urea water to the selective reduction catalyst. There is, however, a problem that the spaced-apart arrangement of the particulate filter and the selective reduction catalyst with a sufficient distance in between would significantly impair a mountability on a vehicle.

Accordingly, devised was an exhaust emission control device as shown in FIG. 1 comprising a particulate filter 3 for capture of particulates in exhaust gas 1 from an engine and a selective reduction catalyst 4 downstream of the particulate filter 3 and having a property capable of selectively reacting $NO_x$ with ammonia even in the presence of oxygen; the particulate filter 3 and the selective reduction catalyst 4 are encased by casings 5 and 6, respectively, and incorporated in parallel with each other in an exhaust pipe 2 through which the exhaust gas 1 from the engine flows; and an exit end of the particulate filter 3 is connected with an entry end of the selective reduction catalyst 4 through an S-shaped communication passage 7 so that the exhaust gas 1 discharged from the exit end of the particulate filter 3 is turned back in an opposite direction and is guided to the entry end of the adjacent selective reduction catalyst 4.

The communication passage 7 is the S-shaped structure comprising a gas gathering chamber 7A encompassing the exit end of the particulate filter 3 to gather the exhaust gas 1 just discharged from the exit end through substantially perpendicular turnabout, a mixing pipe 7B for extraction of the gathered exhaust gas 1 in the chamber 7A in a direction opposite to that of the exhaust gas flow in the particulate filter 3 and a gas dispersing chamber 7C for dispersion of the exhaust gas 1 from the mixing pipe 7B through substantially perpendicular turnabout and for encompassing of the entry end of the selective reduction catalyst 4 to guide the dispersed exhaust gas 1 to the entry end of the catalyst. The entry end of the mixing pipe 7B is centrally provided with a urea water adding injector 8 (urea water adding means) for addition of the urea water into the mixing pipe 7B and directed to the exit end of the mixing pipe 7B.

In the example illustrated, an oxidation catalyst 9 is installed inside the casing 5 before the particulate filter 3 to perform an oxidation treatment of unburned fuel in the exhaust gas 1. An ammonia reducing catalyst 10 is installed inside the casing 6 after the selective reduction catalyst 4 to perform an oxidation treatment of surplus ammonia.

With such a configuration employed, the particulates in the exhaust gas 1 are captured by the particulate filter 3; and, downstream thereof, the urea water is added in the exhaust gas 1 midway of the mixing pipe 7B by the urea water adding injector 8 and is thermally decomposed into ammonia and carbon dioxide; then, on the selective reduction catalyst 4, $NO_x$ in the exhaust gas 1 is well reduced and purified by the ammonia. As a result, the simultaneous reduction of the particulates and $NO_x$ in the exhaust gas 1 can be achieved.

In this case, the fact that the exhaust gas 1 discharged from the exit end of the particulate filter 3 is turned around in the opposite direction by the communication passage 7 and then guided to the entry end of the adjacent selective reduction catalyst 4 ensures a long distance from the added position of the urea water to the selective reduction catalyst 4 and ensures a sufficient reaction time for production of ammonia from the urea water.

Moreover, the fact that the particulate filter 3 and the selective reduction catalyst 4 are arranged in parallel with each other and the communication passage 7 is arranged between and alongside of the particulate filter 3 and selective reduction catalyst 4 makes an overall configuration compact in size, thereby substantially improving the mountability on the vehicle.

A conventional technology document related to this type of exhaust emission control device with a particulate filter 3 and a selective reduction catalyst 4 arranged in parallel with each other and interconnected through an S-shaped communication passage 7 is, for example, the following Patent literature 1.

CITATION LIST

Patent Literature

[Patent Literature 1] JP 2008-215286A

SUMMARY OF INVENTION

Technical Problems

As disclosed in the above Patent literature 1, employed at the added position of the urea water by the urea water adding injector 8 is a mixer structure 15 which tangentially guides the exhaust gas 1 from the gas gathering chamber 7A to opening sections 11 at the entry end of the cylindrical mixing pipe 7B shown in FIG. 2 by guide fins 12, 13 and 14 to thereby afford a swirling flow to the exhaust gas 1, and the urea water from the urea water adding injector 8 being added centrally of the swirling flow, thereby enhancing a mixing performance of the urea water with the exhaust gas 1. This brings about a fear that increasing the added amount of the urea water to seek after higher $NO_x$ emission control would result in, as shown in FIG. 3, formation of a flow of the urea water ungasified which runs on an inner periphery of the mixing pipe 7B along a swirling flow α of the exhaust gas 1 across portions of the opening sections 11 down toward the particulate filter 3.

Specifically, it is feared that running of part of the urea water from the opening sections 11 down toward the particulate filter 3 leads to not all of the urea water added by the injector 8 being guided as ammonia to the selective reduction catalyst 4, adversely affecting on $NO_x$ emission control performance and added amount control of the urea water.

Moreover, structural materials upstream of the added position of the urea water only have a corrosion resistance against exhaust gas components, so that there is a fear that highly corrosive ammonium carbide, which may be produced in the course of a transformation of the urea water having run down toward the particulate filter 3 into ammonia, induces a rapidly progressive corrosion.

The invention was made in view of the above and has its object to prevent a urea water from running from opening sections at an entry end of a mixing pipe down toward an upstream side.

Solution to Problems

The invention is directed to an exhaust emission control device comprising a selective reduction catalyst for reacting $NO_x$ in an exhaust gas with ammonia, urea water adding means for adding a urea water into the exhaust gas upstream of said selective reduction catalyst and a cylindrical mixing pipe as a connection between said urea water adding means and said selective reduction catalyst, an entry end of said mixing pipe being formed with circumferential opening sections and provided with guide fins for guiding the exhaust gas to said opening sections tangentially of said entry end to thereby provide a mixer structure, said urea water adding means being arranged centrally on the entry end of said mixing pipe and directed toward an exit end thereof for addition of the urea water into a swirling flow of the exhaust gas caused by said mixer structure, characterized in that said opening sections are formed along said swirling flow.

Thus, according to the configuration, even if the added amount of the urea water is increased for enhanced $NO_x$ emission control to cause a flow of the ungasified urea water running on the inner periphery of the mixing pipe along the swirling flow of the exhaust gas, the opening sections at the entry end of the mixing pipe formed along said swirling flow will cause the flow of the ungasified urea water along the swirling flow to run along the opening sections and not across portions of the opening sections, thereby preventing the urea water from running from the opening sections down toward the upstream side.

In the invention, it is preferable that a particulate filter is arranged upstream of the added position of the urea water by the urea water adding means and that a positional relationship between an exit end face of said particulate filter and the opening sections at the entry end of the mixing pipe is shifted axially of said mixing pipe such that an angle of inflow of the exhaust gas having passed through said particulate filter to said opening sections is acute relative to an axis of said mixing pipe.

Such configuration decreases the inflow angle of the exhaust gas having passed through the particulate filter to the opening sections and directs a vector of the flow of the exhaust gas when running to the opening sections toward the exit end of the mixing pipe, which makes it possible to direct vectors of the swirling flow and of the flow of the urea water along the swirling flow more strongly toward the exit end of the mixing pipe, leading to facilitated running of the flow of the urea water over the opening sections and further reliable prevention of the urea water from flowing from the opening sections down toward the upstream side.

Moreover, the fact that the angle made by an inflow direction of the exhaust gas having passed through the particulate filter to the opening sections and a spraying direction of the urea water adding means becomes shallower lessens an effect of the flow of the exhaust gas on the spraying of the urea water, which prevents the spraying of the urea water adding means from being fanned by the flow of the exhaust gas into direct hit and lingering-around of the urea water on and at stagnant areas off the flow of the exhaust gas and a resultant partial corrosion.

Advantageous Effects of Invention

According to the exhaust emission control device of the invention described above, various excellent effects can be exhibited as described below.

(I) According to the invention claimed in claim 1, even if the added amount of the urea water is increased so as to enhance $NO_x$ emission control performance and thus the urea water not gasified forms a flow running on the inner periphery of the mixing pipe along the swirling flow of the exhaust gas, the urea water can be prevented from running from the opening sections at the entry end of the mixing pipe down toward the upstream side and therefore, all of the urea water added by the urea water adding means can be guided as ammonia to the selective reduction catalyst to maintain well the $NO_x$ emission control performance and the added amount control of the urea water and to prevent occurrence of corrosion attributable to the urea water flowing down toward the upstream side.

(II) According to the invention claimed in claim 2, the inflow angle of the exhaust gas having passed through the particulate filter to the opening sections is made small so that a vector of the flow of the exhaust gas when running to the opening sections can be directed toward the exit end of the mixing pipe. As a result, vectors of the swirling flow and of the flow of the urea water along the swirling flow can be directed more strongly toward the exit end of the mixing pipe, leading to facilitated running of the flow of the urea water over the opening sections and further reliable prevention of the urea water from flowing from the opening sections down toward the upstream side.

(III) According to the invention claimed in claim 2, the angle made by the inflow direction of the exhaust gas to the opening sections and the spraying direction of the urea water adding means can be made shallow to lessen the effect of the flow of the exhaust gas on the spraying of the urea water, which can prevent the spray from the urea water adding means from being fanned by the exhaust gas flow into direct hit and lingering-around of the urea water on and at the stagnant areas off the flow of the exhaust gas and a resultant partial corrosion.

DESCRIPTION OF EMBODIMENTS

Embodiments of the invention will be described with reference to the drawings.

Figure 1:
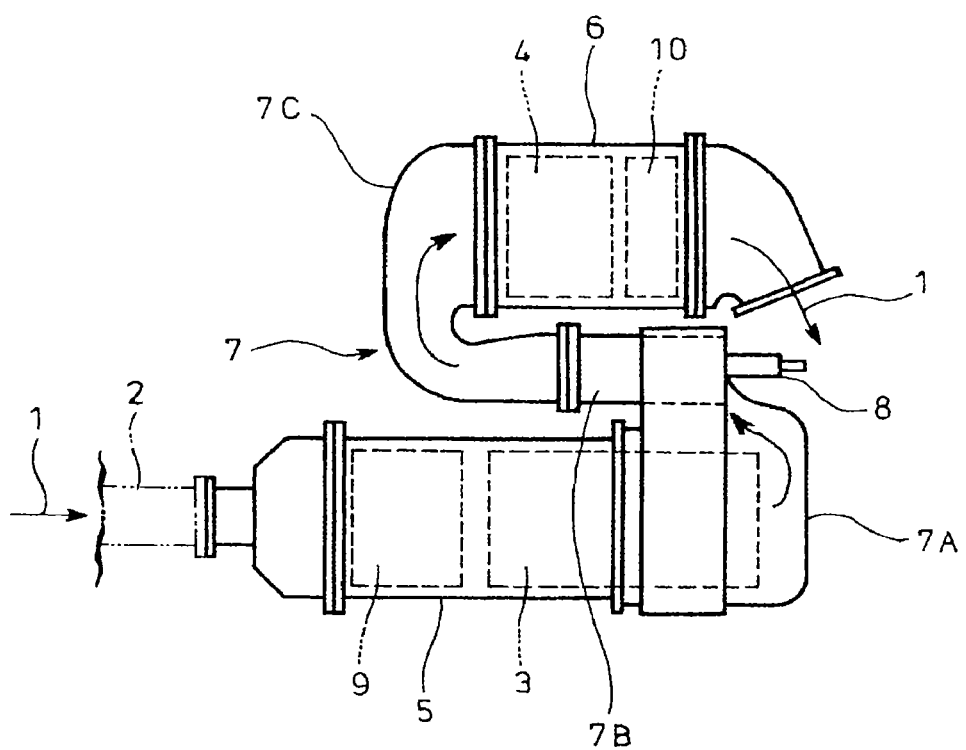
FIG. 1 is a plan view of a conventional exhaust emission control device.
Figure 2:
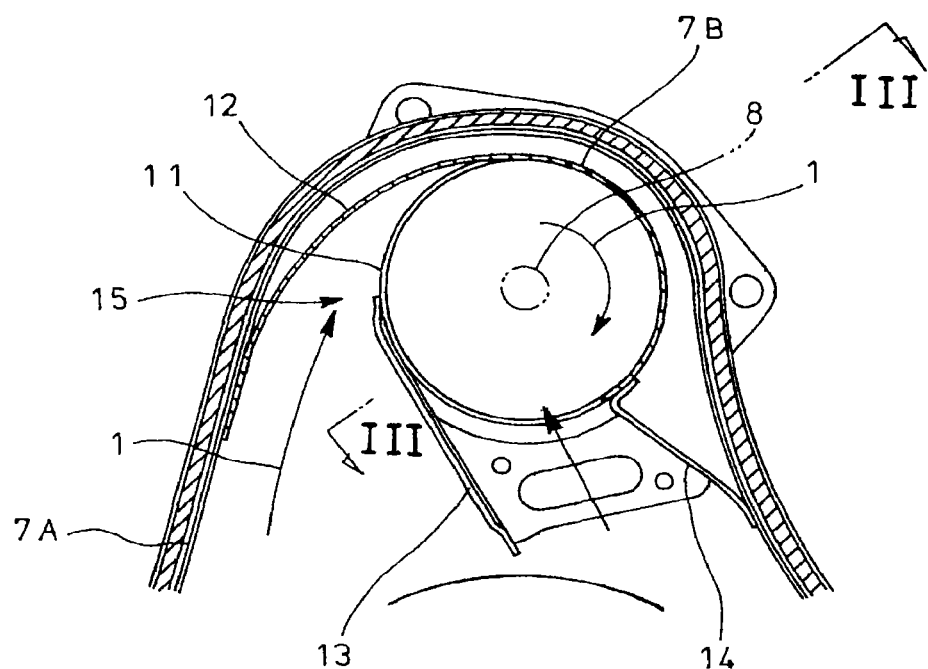
FIG. 2 is a sectional view showing particulars of a substantial part in FIG. 1.
Figure 3:
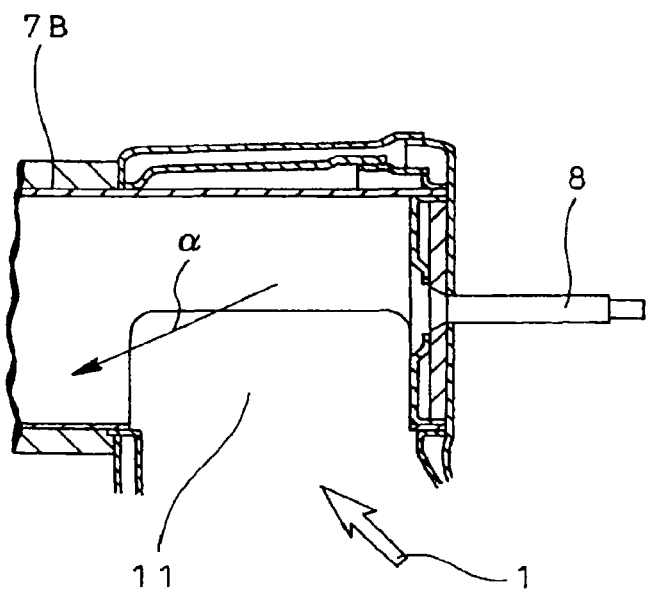
FIG. 3 is a sectional view taken along arrowed line in FIG. 2.
Figure 4:
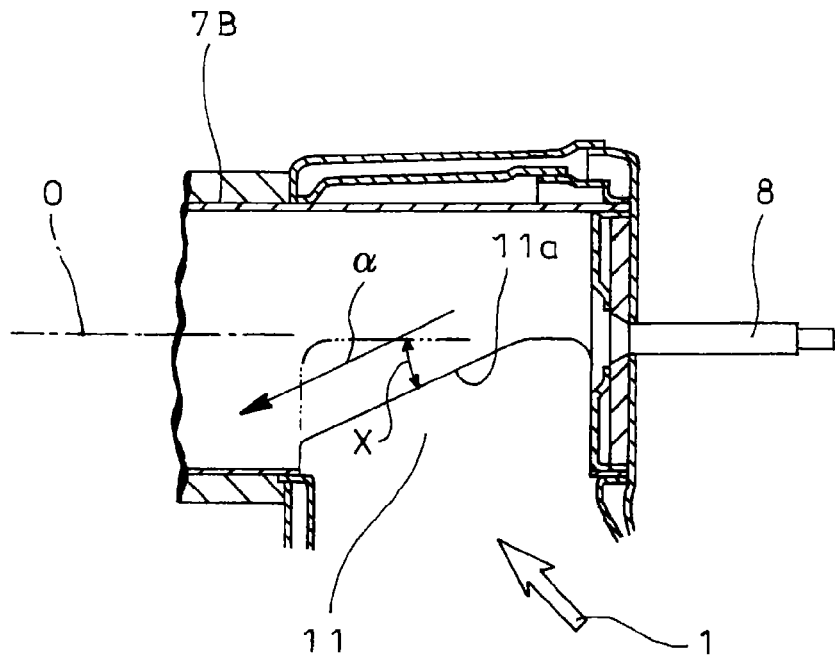
FIG. 4 is a sectional view showing an embodiment of the invention.
Figure 5:
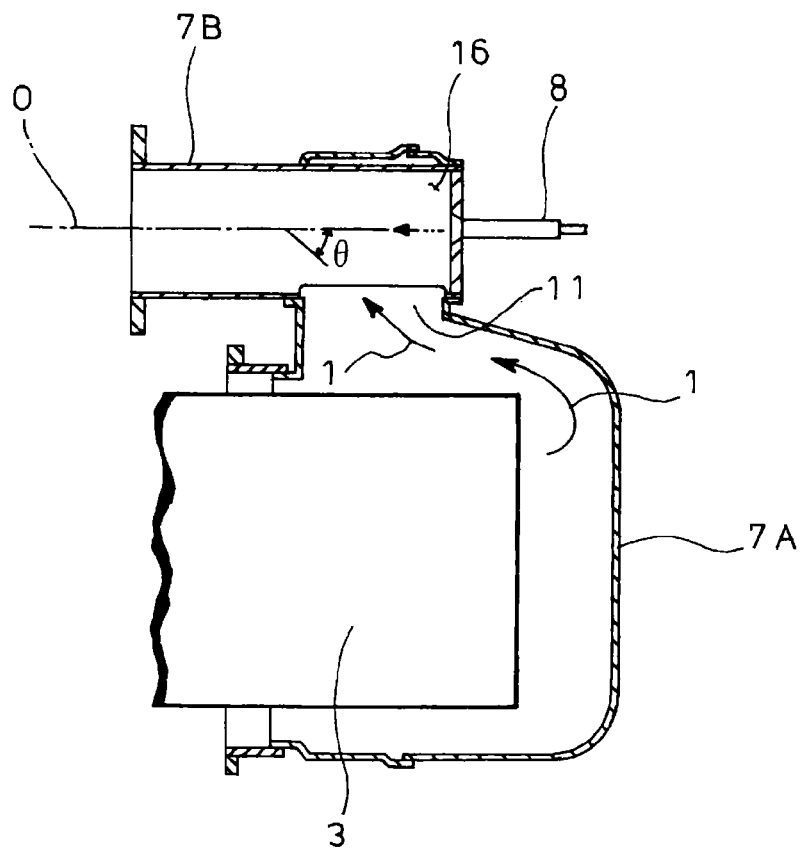
FIG. 5 is a sectional view showing a construction around an entry end of a mixing pipe shown in FIG. 4.

FIGS. 4 and 5 show an embodiment of the invention in which parts similar to those in FIGS. 1-3 are represented by same reference numerals.

As shown in FIG. 4, the embodiment is characteristic in that opening sections 11 at an entry end of the mixing pipe 7B of the exhaust emission control device configured similarly to that illustrated in FIGS. 1-3 are formed along the swirling flow α of the exhaust gas 1 caused by the mixer structure 15 (see FIG. 2).

Specifically, unlike existing opening sections 11 each opened in a substantially simple rectangular shape as shown by a two-dot chain line in FIG. 4, one side 11a of the opening section 11 is formed along the swirling flow α, inclined at an angle X relative to a direction parallel to an axis of the mixing pipe 7B (O in FIGS. 4 and 5 represents the axis of the mixing pipe 7B) as shown by a solid line in FIG. 4.

Moreover, as shown in FIG. 5, this embodiment is configured such that a positional relationship of an exit end face of the particulate filter 3 and the opening sections 11 at the entry end of the mixing pipe 7B is shifted axially of the mixing pipe 7B so that an inflow angle θ of the exhaust gas 1 having passed through the particulate filter 3 to the opening sections 11 is acute relative to the axis of the mixing pipe 7B.

While the illustration of the guide fins 12, 13 and (see FIG. 2) is omitted from FIGS. 4 and 5 for the convenience of description, it goes without saying that the guide fins 12, 13 and 14 (see FIG. 2) are arranged to tangentially guide the exhaust gas 1 to the opening sections 11 as earlier described in FIGS. 1-3.

Thus, with the exhaust emission control device configured as above, even if the added amount of the urea water is increased for enhancement of the $NO_x$ emission control performance and thus the urea water not gasified forms the flow running on the inner periphery of the mixing pipe 7B along the swirling flow α of the exhaust gas 1, the flow of the urea water along the swirling flow a runs along the opening sections 11 and does not form the flow running across portions of the opening sections 11 at the entry end of the mixing pipe 7B since the opening sections 11 are formed along the swirling flow α. As a result, the urea water is prevented from running from the opening sections 11 down toward the particulate filter 3 (toward the upstream side).

In addition, this embodiment is particularly configured such that the inflow angle θ of the exhaust gas 1 having passed through the particulate filter 3 to the opening sections 11 is acute relative to the axis of the mixing pipe 7B, so that the inflow angle θ of the exhaust gas 1 having passed through the particulate filter 3 to the opening sections 11 becomes small and a vector of the flow of the exhaust gas 1 when running to the opening sections 11 is directed toward the exit end of the mixing pipe 7B (left side in FIG. 5).

This makes it possible to direct the vectors of the swirling flow α and of the flow of the urea water along the swirling flow α more strongly toward the exit end of the mixing pipe 7B, which facilitates the running of the flow of the urea water over the opening sections 11, further suppressing flowing-down of the urea water from the opening sections 11 toward the particulate filter 3.

Moreover, with the angle made by the direction of the inflow of the exhaust gas 1 having passed through the particulate filter 3 to the opening sections 11 and the spraying direction of the urea water adding injector 8 (see arrowed dotted line in FIG. 5) becoming shallow, the effect of the flow of the exhaust gas 1 on the spraying of the urea water is lessened, so that the spray from the urea water adding injector 8 is prevented from being fanned by the flow of the exhaust gas 1 into direct hit and lingering-around of the urea water on and at stagnant areas 16 off the flow of the exhaust gas 1 and a resultant partial corrosion.

Therefore, according to the above embodiment, even if the added amount of the urea water being increased for enhancement of the $NO_x$ emission control performance and the urea water not gasified forms the flow running on the inner periphery of the mixing pipe 7B along the swirling flow α of the exhaust gas 1, the urea water can be prevented from running from the opening sections 11 at the entry end of the mixing pipe 7B down toward the particulate filter 3, so that all of the urea water added by the urea water adding injector 8 can be guided as ammonia to the selective reduction catalyst, making it possible to maintain well the $NO_x$ emission control performance and the added amount control of the urea water and to prevent occurrence of the corrosion attributable to the urea water flowing down toward the particulate filter 3.

Since the inflow angle θ of the exhaust gas 1 having passed through the particulate filter 3 to the opening sections 11 is made small so that a vector of the flow of the exhaust gas 1 when running to the opening sections 11 can be directed toward the exit end of the mixing pipe 7B, the vectors of the swirling flow α and the flow of the urea water along the swirling flow α are directed more strongly toward the exit end of the mixing pipe 7B, which can facilitate the running of the flow of the urea water over the opening sections 11 and can prevent more reliably the flowing-down of the urea water from the opening sections 11 toward the particulate filter 3.

Furthermore, since the angle made by the direction of the inflow of the exhaust gas 1 to the opening sections 11 and the spraying direction of the urea water adding injector 8 is made shallow so that the effect of the flow of the exhaust gas 1 on the spraying of the urea water can be lessened, which prevents the spraying of the urea water adding injector 8 from being fanned by the flow of the exhaust gas 1 into directly hit and lingering-around of the urea water on and at the stagnant areas 16 off the flow of the exhaust gas 1 and a resultant partial corrosion.

Figure 6:
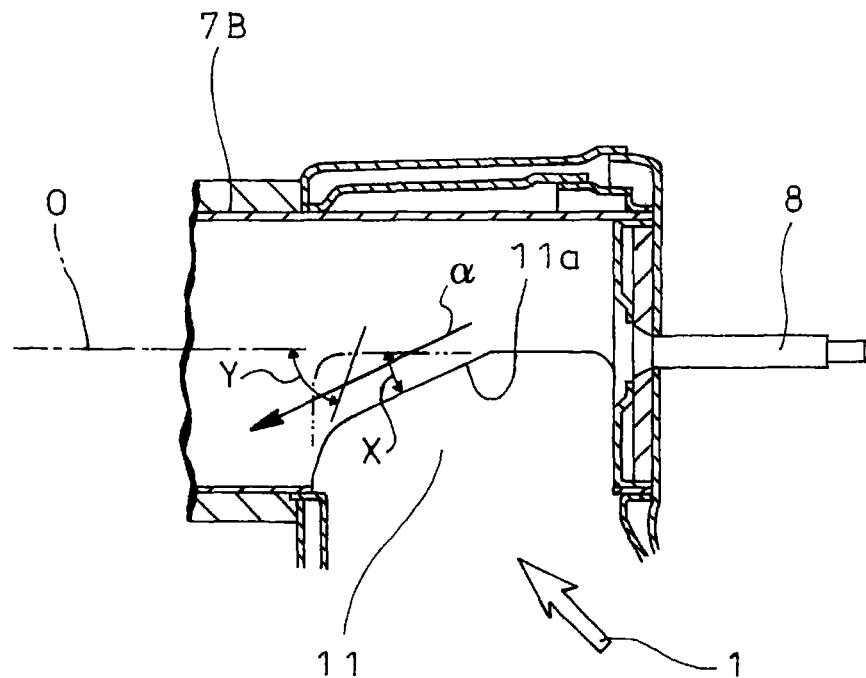
FIG. 6 is a sectional view showing a further embodiment of the invention.

FIG. 6 shows a further embodiment of the invention. The one side 11a of the opening section 11 described in the embodiment in FIG. 4, at its terminating portion toward an exit side of the mixing pipe 7B, is inclined at angle Y (angle relative to the direction parallel to the axis of the mixing pipe 7B) which is deeper than the angle X. Since this makes it possible to guide the flow of the urea water along the one side 11a of the opening section 11 smoothly and continuously toward the downstream side by the further angle Y, the flowing down of the urea water from the opening sections 11 can be prevented with further reliability.

Figure 7:
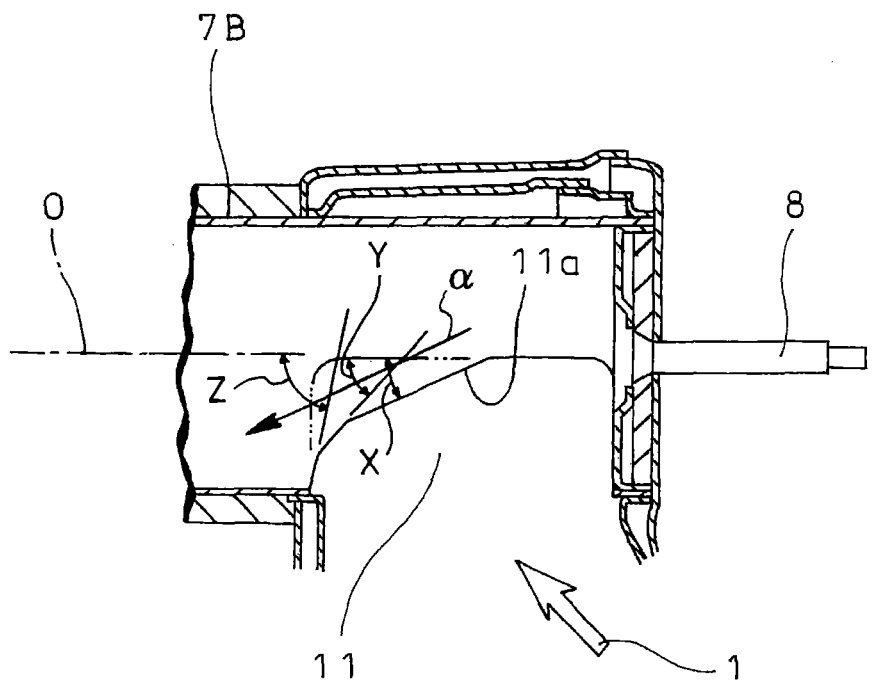
FIG. 7 is a sectional view of a still further embodiment of the invention.

As is shown in a still further embodiment of the invention in FIG. 7, the one side 11a of the opening section 11, at its terminating portion toward the exit side of the mixing pipe 7B, may be inclined by two steps of angles Y and Z ($X \leq y \leq Z$). Furthermore, the one side 11a may be alternatively inclined step by step by combining three or more steps of angles or may be inclined by joining curves continuously.

It is to be understood that an exhaust emission control device according to the invention is not limited to the above embodiments and that various changes and modifications may be made without departing from the scope of the invention.

REFERENCE SIGNS LIST 1 exhaust gas
3 particulate filter
4 selective reduction catalyst
7B mixing pipe
8 urea water adding injector (urea water adding means)
11 opening
12 guide fin
13 guide fin
14 guide fin
15 mixer structure
α swirling flow
θ inflow angle

The invention claimed is:

1. An exhaust emission control device comprising:
 a selective reduction catalyst for reacting NOx in an exhaust gas with ammonia,
 urea water adding means for adding a urea water into the exhaust gas upstream of said selective reduction catalyst; and
 a cylindrical mixing pipe as a connection between said urea water adding means and said selective reduction catalyst, an entry end of said mixing pipe having circumferential opening sections and including guide fins for guiding the exhaust gas to said opening sections tangentially of said entry end to thereby provide a mixer structure, and said urea water adding means being arranged centrally on the entry end of said mixing pipe and directed toward an exit end thereof for addition of the urea water into a swirling flow of the exhaust gas caused by said mixer structure,
 wherein one side of said respective opening sections is formed along said swirling flow, inclined relative to a direction parallel to an axis of said mixing pipe.

2. The exhaust emission control device as claimed in claim 1, further comprising a particulate filter arranged upstream of an added position of the urea water by the urea water adding means,
 wherein a positional relationship between an exit end face of said particulate filter and the opening sections at the entry end of the mixing pipe is shifted axially of said mixing pipe such that an angle of inflow of the exhaust gas having passed through said particulate filter to said opening sections is acute relative to the axis of said mixing pipe.

3. The exhaust emission control device as claimed in claim 1, wherein a terminating portion of the respective opening sections is inclined at a terminating angle relative to the direction parallel to the axis of said mixing pipe, the terminating angle being inclined more than the one side of said respective opening sections.

* * * * *